United States Patent
Chen et al.

(10) Patent No.: US 12,359,984 B2
(45) Date of Patent: Jul. 15, 2025

(54) METHOD FOR DISPLAYING AND DETECTING TEMPERATURE FIELD DISTRIBUTION OF FLUID SURFACE

(71) Applicant: NANJING TECH UNIVERSITY, Nanjing (CN)

(72) Inventors: Xiaoqiang Chen, Nanjing (CN); Yahui Chen, Nanjing (CN); Sheng Lu, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 863 days.

(21) Appl. No.: 17/494,872

(22) Filed: Oct. 6, 2021

(65) Prior Publication Data

US 2022/0113202 A1 Apr. 14, 2022

(30) Foreign Application Priority Data

Oct. 9, 2020 (CN) .......................... 202011070631.2

(51) Int. Cl.
*G01K 11/00* (2006.01)
*G01K 11/16* (2021.01)

(52) U.S. Cl.
CPC .................................... *G01K 11/16* (2013.01)

(58) Field of Classification Search
CPC ........ G01K 11/20; G01K 13/02; G01K 11/12; G01K 11/16
USPC ............... 1/221, 3; 11/16; 436/172
See application file for complete search history.

(56) References Cited

U.S. PATENT DOCUMENTS

| 2007/0172951 A1* | 7/2007 | Levy .................... | C07D 409/14 |
| | | | 422/400 |
| 2016/0376247 A1* | 12/2016 | Kang .................... | G01K 11/20 |
| | | | 435/29 |

OTHER PUBLICATIONS

Roibu et al. "Design and characterization of visible-light LED sources for microstructured photoreactors" React. Chem. Eng., 2018, 3,849 (Year: 2018).*
Chen et al., "Photostimulated Spiropyran for Instantaneous Visualization of Thermal Field Distribution and Flow Pattern", Journal of the American Chemical Society (JACS) vol. 142, Issue 47, Oct. 30, 2020, pp. 20066-20070.

* cited by examiner

*Primary Examiner* — Elizabeth A Robinson
*Assistant Examiner* — Emily R. Berkeley
(74) *Attorney, Agent, or Firm* — Keating & Bennett, LLP (57) ABSTRACT

A method for displaying and detecting temperature field distribution of a fluid surface applies a stimulus-responsive compound to high-resolution and high-precision imaging of a temperature field of a fluid for the first time. Under physical or chemical stimulation, an imaging developer visualizes the temperature field distribution of the fluid surface. The method for displaying and detecting temperature field distribution of the fluid surface includes dissolving or dispersing an imaging reagent in a fluid, stimulating the fluid surface to change a color or a fluorescence of the imaging reagent, collecting images of a generated color or a generated fluorescence to obtain a temperature field distribution diagram of the fluid surface.

9 Claims, 5 Drawing Sheets

METHOD FOR DISPLAYING AND DETECTING TEMPERATURE FIELD DISTRIBUTION OF FLUID SURFACE

CROSS REFERENCE TO RELATED APPLICATION

This patent application claims the benefit and priority of Chinese Patent Application No. 202011070631.2 filed on Oct. 9, 2020, the disclosure of which is incorporated by reference herein in its entirety as part of the present application.

TECHNICAL FIELD

The present disclosure relates to a method for displaying and detecting temperature field distribution, more specifically, to a method for displaying and detecting temperature field distribution of a fluid surface.

BACKGROUND ART

The orderly dynamic self-assembly model is attractive from the perspective of aesthetics and the relevance of theory and practice. Compared with static self-assembly, the realization and understanding of a dynamic self-assembly system that forms an ordered pattern through energy dissipation is a greater challenge, because it not only exists in a place far from equilibrium, but also requires the synergy of different components. In order to explore this dynamic process, it is necessary to develop real-time and effective tools to capture and visualize this dynamic process with high resolution and accuracy. Existing fluid surface temperature field imaging methods mainly rely on infrared cameras. Although the thermal imaging technology of infrared cameras can meet this requirement to a certain extent, the equipment is expensive, and the resolution is not high in actual use, so it is impossible to perform timely imaging observations on the flow state of the fluid in the cold zone. If imaging reagents that respond to physical or chemical stimuli are used, the molecular aggregation dynamic self-assembly process can be captured and visualized on the fluid surface to obtain the temperature field distribution information of the fluid surface, so as to develop a method for displaying and detecting temperature field distribution of the fluid surface. This method has the characteristics of high resolution, cheap equipment and simplicity.

SUMMARY

The technical problem to be solved by the present disclosure is to overcome the shortcomings of the prior art and provide a method for displaying and detecting temperature field distribution of a fluid surface using a stimulus-responsive compound that can perform high-resolution and high-precision imaging of the temperature field of the fluid under induction of external conditions, and the addition of imaging reagents will not affect the distribution of the temperature field on the fluid surface. The present disclosure applies a stimulus-responsive compound to the high-resolution and high-precision imaging of the temperature field of the fluid for the first time, under physical or chemical stimulation, this type of imaging developer has the function of visualizing the temperature field distribution on the fluid surface.

A method for displaying and detecting temperature field distribution of a fluid surface of the present disclosure includes dissolving or dispersing an imaging reagent in a fluid, stimulating the fluid surface to change a color or a fluorescence of the imaging reagent, and collecting images of a generated color or a generated fluorescence to obtain a temperature field distribution diagram of the fluid surface.

The imaging reagent may be an imaging reagent including a photochromic property, a photoluminescence property, a chemochromic property, a chemiluminescence property, an electrochromic property or an electroluminescence property.

The imaging reagent may be spiropyrans, azos, indoles, spirooxazines, benzofurans, fulgides, diarylethylenes, xanthenes, viologens, polycyclic quinones or aniline derivatives.

The stimulating the fluid surface may include using illumination, acid, alkali, volatile gas, electrical stimulation, magnetic stimulation, microwaves, or plasma.

An illumination wavelength range of the illumination stimulation is preferably about 200 nm to about 1000 nm, and the imaging reagent is preferably a spiropyran or an indole chromotropic dye reagent.

An illumination wavelength range of the illumination stimulation is preferably about 200 nm to about 600 nm.

A method for displaying and detecting temperature field distribution of a fluid surface of the present disclosure includes dissolving imaging reagents having a structural formula of BS1-SP, BS2-SP, N-SP, G-SP or F-DAE in an organic solvent, illuminating the organic solvent including the imaging reagents dissolved therein with a wavelength range of about 200 nm to about 600 nm to show patterns of different shapes on a surface of the organic solvent, and collecting a generated pattern to obtain a temperature field distribution diagram of the fluid surface, wherein a structural formula of the imaging reagent is as follows:

BS1-SP

BS2-SP

The organic solvent may be dichloromethane, 1-bromopropane, chloroform, 1,2-dichloroethane, tetrahydrofuran, 2-bromopropane, ethyl acetate, ethanol, ethyl ether, n-pentane, methanol, acetone, acetonitrile, dimethyl sulfoxide or N, N-dimethylformamide.

Measurement target fluids used may include but are not limited to liquids with flow properties such as aqueous solutions, organic solvents, oils, blood, and dairy products.

Container materials used may include but are not limited to polymer, metal and non-metal materials.

An imaging container used may be an agate mortar, a dish-shaped container, a spherical container, a square container and other vessels with a containing function.

Image acquisition may use mobile phones, ordinary cameras, CCD cameras, fluorometers and other imaging devices with color or fluorescence acquisition functions.

The photochromic developer used can visualize the temperature field distribution of the fluid surface.

Compared with a commercially available infrared camera, the methods of the present disclosure achieve high imaging resolution and high accuracy. The imaging methods of the present disclosure are simple and easy to implement, and the equipment requirements are not high.

The above and other elements, features, steps, characteristics and advantages of the present disclosure will become more apparent from the following detailed description of example embodiments with reference to the attached drawings.

DETAILED DESCRIPTION OF EXAMPLE EMBODIMENTS

Hereinafter, the present disclosure will be further described in detail with reference to the accompanying drawings and example embodiments.

Example 1 Preparation of Spiropyran Derivatives BS1-SP, BS2-SP and N-SP (1) An iodized salt of 2.693 g of 2-(5-alkyl-4-uronyl-2-hydroxyphenyl) benzothiazole and 3.513 g-3.864 g of 1,1,2-trimethyl-1H-benzo [e] indole was dissolved in 100 mL of ethanol solution, stirred and mixed, and then 1-10 mL of piperidine was added dropwise at room temperature. The mixed solution was refluxed at 65-80° C. for 4-12 h. After the reaction was completed by dot plate detection, the ethanol solvent was removed by a rotary evaporator under reduced pressure, 20-80 mL of methanol solution was added under stirring at 40-60° C. in a water bath, a light yellow precipitate was quickly precipitated out in the solution, and the mixed solution was subjected to vacuum suction filtration. After the filter cake was washed for three times with methanol, the light yellow solid was dried in a vacuum drying oven to obtain the product BS1-SP. The measured molecular weight of the pure probe obtained was 474.62.

(2) An iodized salt of 2.693 g of 2-(5-alkyl-4-uronyl-2-hydroxyphenyl) benzothiazole and 3.012 g-3.313 g of 1,1,2-trimethyl-1H-benzo [e] indole was dissolved in 100 mL of ethanol solution, stirred and mixed, then 1-10 mL of piperidine was added dropwise at room temperature. The mixed solution was refluxed at 65-80° C. for 4-12 h. After the reaction was completed by dot plate detection, the ethanol solvent was removed under reduced pressure with a rotary evaporator, and 20-80 mL of methanol solution was added under stirring at 40-60° C. in a water bath. A light yellow precipitate was precipitated out quickly in the solution, the mixed solution was subjected to vacuum suction filtration, the filter cake was washed with methanol for three times, and the light yellow solid was dried in a vacuum drying oven to obtain the product BS2-SP. The measured molecular weight of the pure probe obtained was 424.56.

(3) An iodized salt of 1.671 g of 5-nitrosalicylic aldehyde and 3.012 g-3.313 g of 1,1,2-trimethyl-1H-benzo[e]indole was dissolved in 100 mL of ethanol solution, stirred and mixed, then 1-10 mL of piperidine was added dropwise at room temperature. The mixed solution was refluxed at 65-80° C. for 4-12 h. After the reaction was completed by dot plate detection, the ethanol solvent was removed under reduced pressure with a rotary evaporator, and 20-80 mL of methanol solution was added under stirring at 40-60° C. in a water bath. A gray-yellow precipitate was precipitated out quickly in the solution, the mixed solution was subjected to vacuum suction filtration, the filter cake was washed with methanol for three times, and the light yellow solid was dried in a vacuum drying oven to obtain the product N-SP. The measured molecular weight of the pure probe obtained was 322.36.

Figure 1:
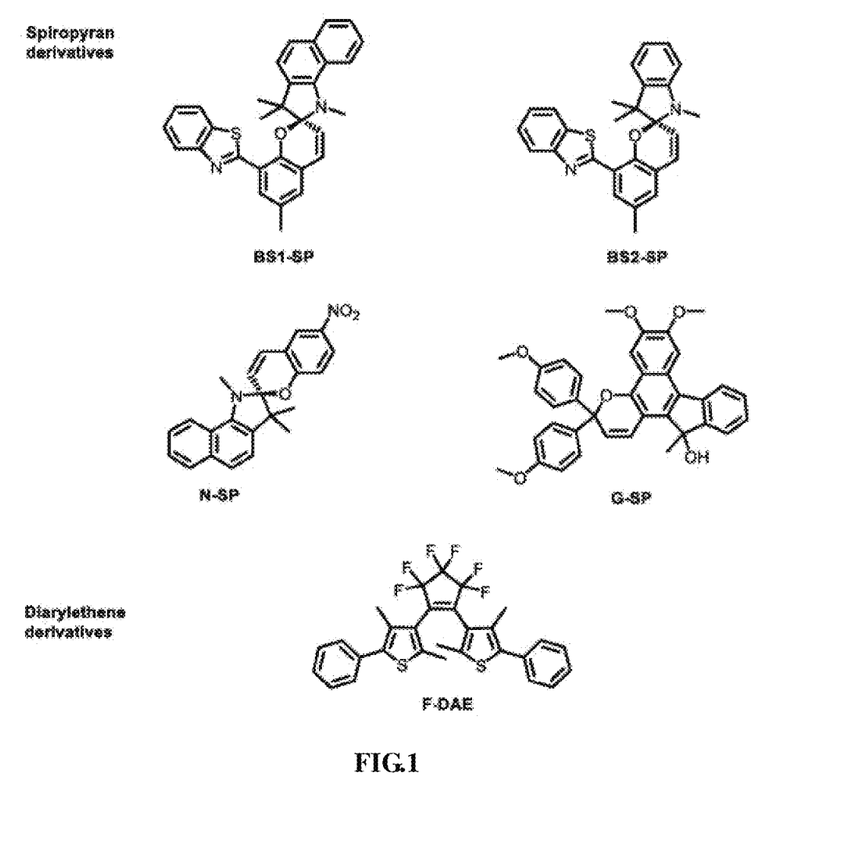
FIG. 1 is a schematic diagram of the molecular structure of the imaging reagent in Example 1 of the present disclosure.
Figure 2:
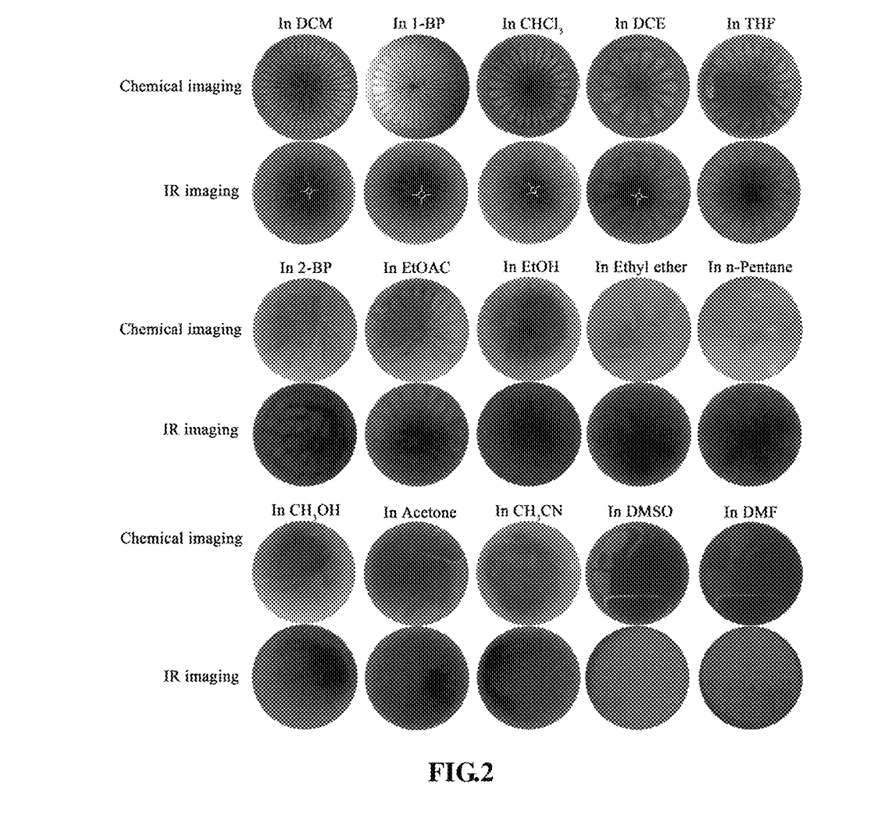
FIG. 2 shows the temperature field distribution of solvent surface for different organic solvents under the stimulation of ultraviolet light by color developer BS1-SP in an agate mortar of Example 2 of the present disclosure.

Example 2 Imaging of the Temperature Field of Solvent Surface for Different Organic Solvents in an Agate Mortar by Spiropyran Derivative BS1-SP 1-5 mg of BS1-SP was weighed in an agate mortar, 3-5 mL of organic solvent was added thereto, taking dichloromethane (DCM), 1-bromopropane (1-BP), chloroform (CHCl$_3$), 1,2-dichloroethane (DCE), tetrahydrofuran (THF), 2-bromopropane (2-BP), ethyl acetate (EtOAC), ethanol (EtOH), ethyl ether, n-pentane, methanol (MeOH), acetone, methyl cyanide (MeCN), dimethyl sulfoxide (DMSO) and N, N-dimethylformamide (DMF) as examples, after BS1-SP was completely dissolved in the organic solvent, it was stimulated and illuminated with ultraviolet light for 1 s-5 s, and green patterns of different shapes appeared on the surface of the organic solvent. Images of the generated patterns were collected to obtain the temperature field distribution diagram of the fluid surface. The ultraviolet light was turned off, the green pattern gradually disappeared under the action of visible light, until the solution became colorless, the result is shown in FIG. 2.

Figure 3:
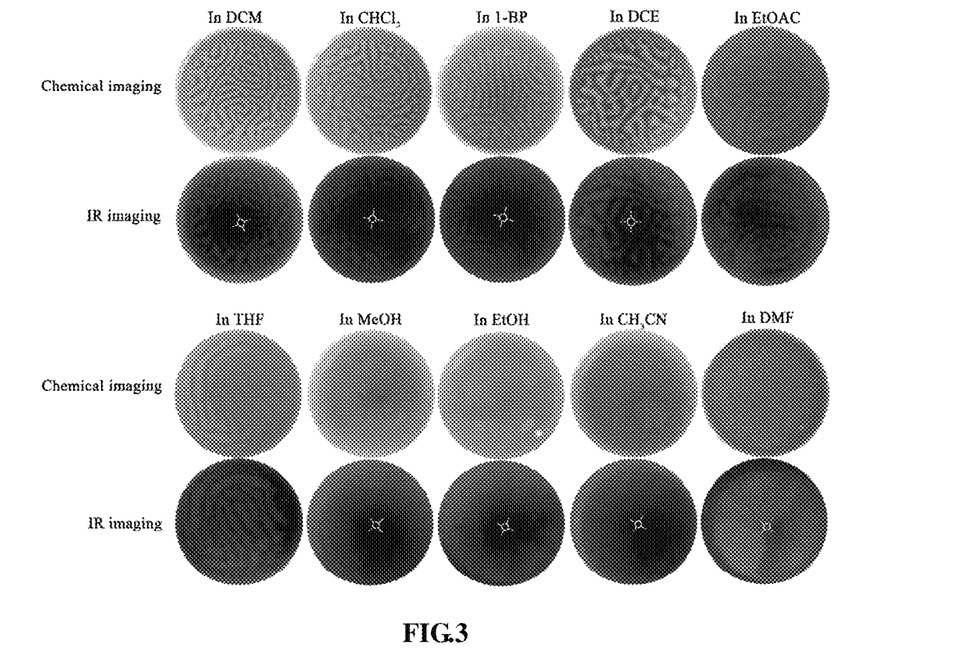
FIG. 3 shows the temperature field distribution of solvent surface for different organic solvents under the stimulation of ultraviolet light by color developer BS1-SP in a dish-shaped container of Example 3 of the present disclosure.

Example 3 Imaging of the Temperature Field of Solvent Surface for Different Organic Solvents in a Dish-Shaped Container by Spiropyran Derivative BS1-SP 1-5 mg of BS1-SP was weighed in a dish-shaped container, 3-5 mL of organic solvent was added thereto, taking dichloromethane (DCM), chloroform (CHCl$_3$), 1-bromopropane (1-BP), 1,2-dichloroethane (DCE), ethyl acetate (EtOAC), tetrahydrofuran (THF), methanol (MeOH), ethanol (EtOH), methyl cyanide (MeCN), and N, N-dimethylformamide (DMF) as examples, after BS1-SP was completely dissolved in the organic solvent, it was stimulated and illuminated with ultraviolet light for 1 s-5 s, and green patterns of different shapes appeared on the surface of the organic solvent; then images of the generated patterns were collected to obtain the temperature field distribution diagram of the fluid surface. The ultraviolet light was turned off, the green pattern gradually disappeared under the action of visible light, until the solution became colorless, the result is shown in FIG. 3.

Figure 4:
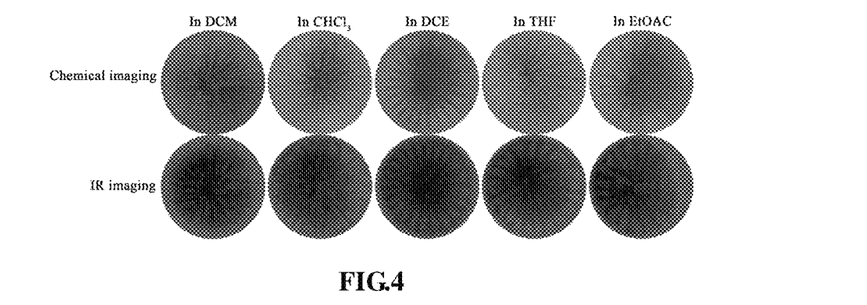
FIG. 4 shows the temperature field distribution of solvent surface for different organic solvents under the stimulation of ultraviolet light by color developer BS2-SP in an agate mortar of Example 4 of the present disclosure.

Example 4 Imaging of the Temperature Field of Solvent Surface for Different Organic Solvents in an Agate Mortar by Spiropyran Derivative BS2-SP 1-5 mg of BS2-SP was weighed in an agate mortar, 3-5 mL of organic solvent was added thereto, taking dichloromethane (DCM), chloroform (CHCl$_3$), 1,2-dichloroethane (DCE), tetrahydrofuran (THF), and ethyl acetate (EtOAC) as examples, after BS2-SP was completely dissolved in the organic solvent, it was stimulated and illuminated with ultraviolet light for 1 s-5 s, and green patterns of different shapes appeared on the surface of the organic solvent; images of the generated patterns were collected to obtain the temperature field distribution diagram of the fluid surface. The ultraviolet light was turned off, the green pattern gradually disappeared under the action of visible light, until the solution became colorless, the result is shown in FIG. 4.

Figure 5:
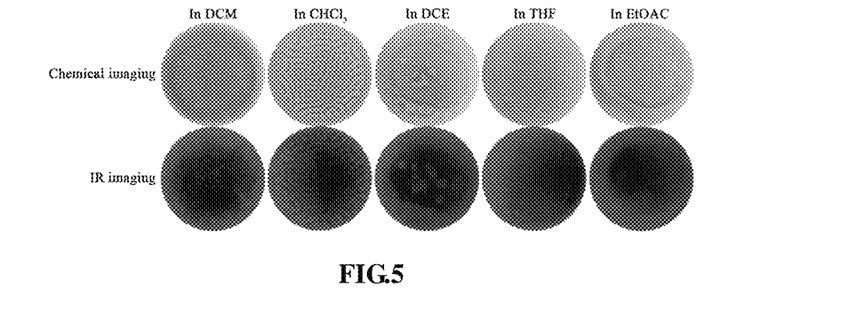
FIG. 5 shows the temperature field distribution of solvent surface for different organic solvents under the stimulation of ultraviolet light by color developer BS2-SP in a dish-shaped container of Example 5 of the present disclosure.

Example 5 Imaging of the Temperature Field of Solvent Surface for Different Organic Solvents in a Dish-Shaped Container by Spiropyran Derivative BS2-SP 1-5 mg of BS2-SP was weighed in a dish-shaped container, 3-5 mL of organic solvent was added thereto, taking dichloromethane (DCM), chloroform (CHCl$_3$), 1,2-dichloroethane (DCE), tetrahydrofuran (THF), and ethyl acetate (EtOAC) as examples, after BS2-SP was completely dissolved in the organic solvent, it was stimulated and illuminated with ultraviolet light for 1 s-5 s, and green patterns of different shapes appeared on the surface of the organic solvent; then images of the generated patterns were collected to obtain the temperature field distribution diagram of the fluid surface. The ultraviolet light was turned off, the green pattern gradually disappeared under the action of visible light, until the solution became colorless, the result is shown in FIG. 5.

Figure 6:
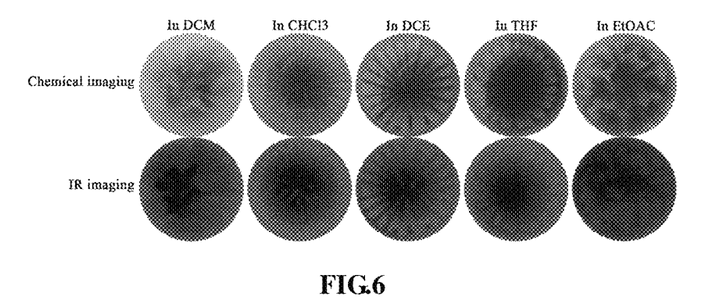
FIG. 6 shows the temperature field distribution of solvent surface for different organic solvents under the stimulation of ultraviolet light by color developer N-SP in an agate mortar of Example 6 of the present disclosure.

Example 6 Imaging of the Temperature Field of Solvent Surface for Different Organic Solvents in an Agate Mortar by Spiropyran Derivative N-SP 1-5 mg of N-SP was weighed in an agate mortar, 3-5 mL of organic solvent was added thereto, taking dichloromethane (DCM), chloroform (CHCl$_3$), 1,2-dichloroethane (DCE), tetrahydrofuran (THF), and ethyl acetate (EtOAC) as examples, after N-SP was completely dissolved in the organic solvent, it was stimulated and illuminated with ultraviolet light for 1 s-5 s, and purple patterns of different shapes appeared on the surface of the organic solvent; images of the generated patterns were collected to obtain the temperature field distribution diagram of the fluid surface. The ultraviolet light was turned off, the purple pattern gradually disappeared under the action of visible light, until the solution became colorless, the result is shown in FIG. 6.

Figure 7:
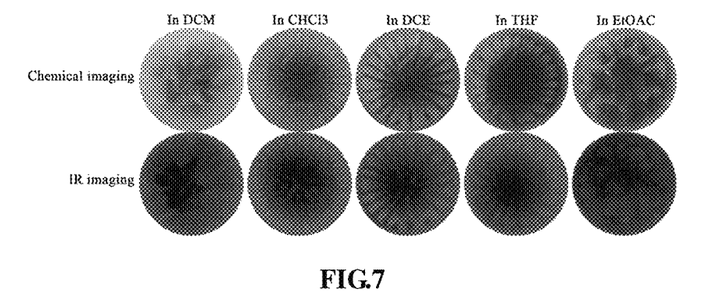
FIG. 7 shows the temperature field distribution of solvent surface for different organic solvents under the stimulation of ultraviolet light by color developer N-SP in a dish-shaped container of Example 7 of the present disclosure.

Example 7 Imaging of the Temperature Field of Solvent Surface for Different Organic Solvents in a Dish-Shaped Container by Spiropyran Derivative N-SP 1-5 mg of N-SP was weighed in a dish-shaped container, 3-5 mL of organic solvent was added thereto, taking dichloromethane (DCM), chloroform ($CHCl_3$), 1,2-dichloroethane (DCE), tetrahydrofuran (THF), and ethyl acetate (EtOAC) as examples, after N-SP was completely dissolved in the organic solvent, it was stimulated and illuminated with ultraviolet light for 1 s-5 s, and purple patterns of different shapes appeared on the surface of the organic solvent; then images of the generated patterns were collected to obtain the temperature field distribution diagram of the fluid surface. The ultraviolet light was turned off, the purple pattern gradually disappeared under the action of visible light, until the solution became colorless, the result is shown in FIG. 7.

Figure 8:
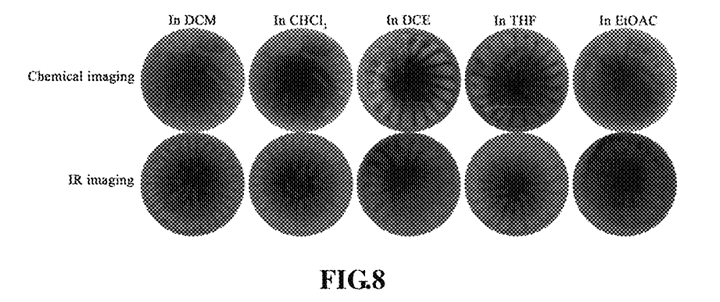
FIG. 8 shows the temperature field distribution of solvent surface for different organic solvents under the stimulation of ultraviolet light by color developer G-SP in an agate mortar of Example 8 of the present disclosure.

Example 8 Imaging of the Temperature Field of Solvent Surface for Different Organic Solvents in an Agate Mortar by Spiropyran Derivative G-SP 1-5 mg of G-SP was weighed in an agate mortar, 3-5 mL of organic solvent was added thereto, taking dichloromethane (DCM), chloroform ($CHCl_3$), 1,2-dichloroethane (DCE), tetrahydrofuran (THF), and ethyl acetate (EtOAC) as examples, after G-SP was completely dissolved in the organic solvent, it was stimulated and illuminated with ultraviolet light for 1 s-5 s, and gray-green patterns of different shapes appeared on the surface of the organic solvent; images of the generated patterns were collected to obtain the temperature field distribution diagram of the fluid surface. The ultraviolet light was turned off, the gray-green pattern gradually disappeared under the action of visible light, until the solution became colorless, the result is shown in FIG. 8.

Figure 9:
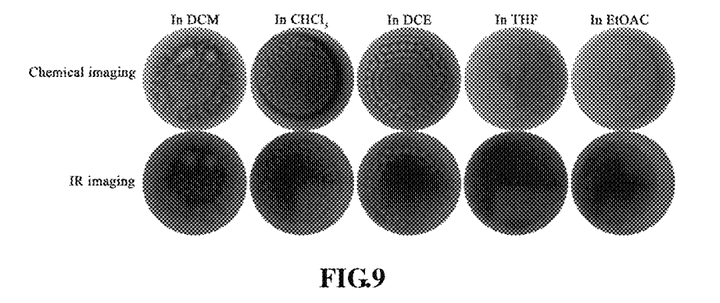
FIG. 9 shows the temperature field distribution of solvent surface for different organic solvents under the stimulation of ultraviolet light by color developer G-SP in a dish-shaped container of Example 8 of the present disclosure.

Example 9 Imaging of the Temperature Field of Solvent Surface for Different Organic Solvents in a Dish-Shaped Container by Spiropyran Derivative G-SP 1-5 mg of G-SP was weighed in a dish-shaped container, 3-5 mL of organic solvent was added thereto, taking dichloromethane (DCM), chloroform ($CHCl_3$), 1,2-dichloroethane (DCE), tetrahydrofuran (THF), and ethyl acetate (EtOAC) as examples, after G-SP was completely dissolved in the organic solvent, it was stimulated and illuminated with ultraviolet light for 1 s-5 s, and gray-green patterns of different shapes appeared on the surface of the organic solvent; images of the generated patterns were collected to obtain the temperature field distribution diagram of the fluid surface. The ultraviolet light was turned off, the gray-green pattern gradually disappeared under the action of visible light, until the solution became colorless, the result is shown in FIG. 9.

Figure 10:
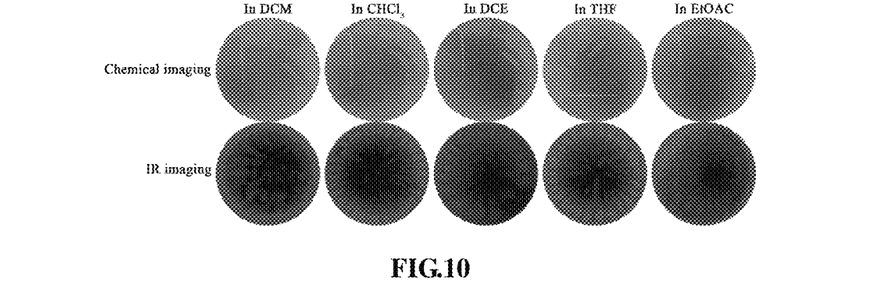
FIG. 10 shows the temperature field distribution of solvent surface for different organic solvents under the stimulation of ultraviolet light by color developer F-DAE in an agate mortar of Example 10 of the present disclosure.

Example 10 Imaging of the Temperature Field of Solvent Surface for Different Organic Solvents in an Agate Mortar by Diarylethylene Derivative F-DAE 1-5 mg of F-DAE was weighed in an agate mortar, 3-5 mL of organic solvent was added thereto, taking dichloromethane (DCM), chloroform ($CHCl_3$), 1,2-dichloroethane (DCE), tetrahydrofuran (THF), and ethyl acetate (EtOAC) as examples, after F-DAE was completely dissolved in the organic solvent, it was stimulated and illuminated with ultraviolet light for 1 s-5 s, and blue-purple patterns of different shapes appeared on the surface of the organic solvent; images of the generated patterns were collected to obtain the temperature field distribution diagram of the fluid surface. The ultraviolet light was turned off, the blue-purple pattern gradually disappeared under the action of visible light, until the solution became colorless, the result is shown in FIG. 10.

Figure 11:
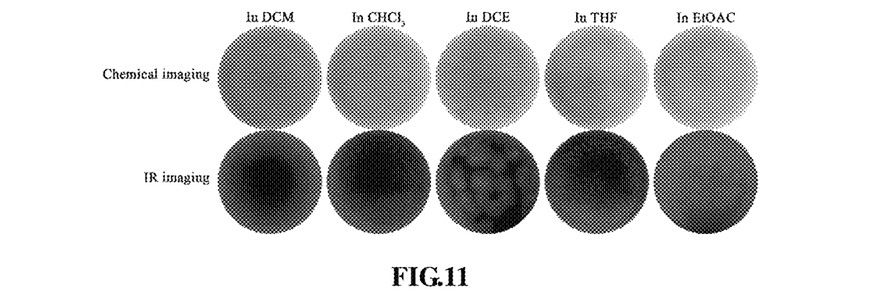
FIG. 11 shows the temperature field distribution of solvent surface for different organic solvents under the stimulation of ultraviolet light by color developer F-DAE in a dish-shaped container of Example 11 of the present disclosure.

Example 11 Imaging of the Temperature Field of Solvent Surface for Different Organic Solvents in a Dish-Shaped Container by Diarylethylene Derivative F-DAE 1-5 mg of F-DAE was weighed in a dish-shaped container, 3-5 mL of organic solvent was added thereto, taking dichloromethane (DCM), chloroform ($CHCl_3$), 1,2-dichloroethane (DCE), tetrahydrofuran (THF), and ethyl acetate (EtOAC) as examples, after F-DAE was completely dissolved in the organic solvent, it was stimulated and illuminated with ultraviolet light for 1 s-5 s, and blue-purple patterns of different shapes appeared on the surface of the organic solvent; images of the generated patterns were collected to obtain the temperature field distribution diagram of the fluid surface. The ultraviolet light was turned off, the blue-purple pattern gradually disappeared under the action of visible light, until the solution became colorless, the result is shown in FIG. 11.

Figure 12:
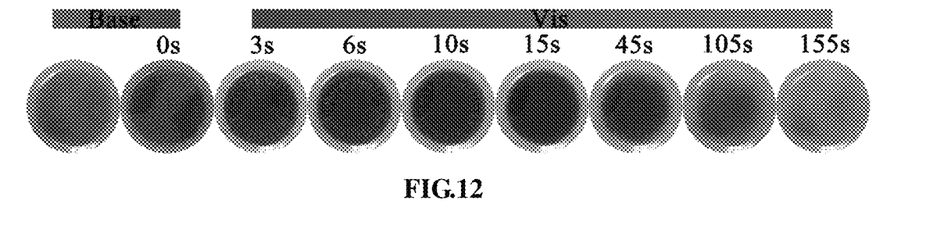
FIG. 12 shows the temperature field distribution of surface of dichloromethane solution under the action of triethylamine by spiropyran derivative color developer BS1-MCH in an agate mortar of Example 12 of the present disclosure.

Example 12 Imaging of the Temperature Field of Solvent Surface for Different Organic Solvents in an Agate Mortar by Piropyran Derivative BS1-MCH 1-5 mg of BS1-MCH was weighed in an agate mortar, 3-5 mL of dichloromethane was added thereto, after BS1-MCH was completely dissolved, the solution turned yellow, an appropriate amount of triethylamine was added to a glass sheet with a diameter of about 10 cm. After it was evenly distributed on the glass sheet, the agate mortar was covered with the glass sheet for about 5 s. A "petal" pattern appeared on the surface of the dichloromethane, and the color of the solution changed from yellow to green. The "petal"-like pattern gradually disappeared under the action of visible light when the glass was removed. After 160 s, the color of the solution changed from green to colorless, the result is shown in FIG. 12.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A method for displaying a temperature field distribution of a fluid surface, the method comprising:
   dissolving an imaging reagent in a fluid to be tested;
   stimulating the fluid surface using illumination to change a color or a fluorescence of the imaging reagent to form a pattern on the fluid surface; and
   collecting an image of the pattern using a non-infrared imaging device and displaying the image collected showing the temperature field distribution of the fluid surface.

2. The method according to claim 1, wherein the imaging reagent includes a photochromic property or a photoluminescence property.

3. The method according to claim 2, wherein the imaging reagent is spiropyrans, indoles, spirooxazines, benzofurans, fulgides, diarylethylenes, or viologens.

4. The method according to claim 3, wherein the imaging reagent is one selected from the group consisting of

BS1-SP

BS2-SP

N-SP

G-SP, F-DAE

5. The method according to claim 1, wherein an illumination wavelength range of the illumination is 200 nm to 1000 nm.

6. The method according to claim 5, wherein the illumination wavelength range of the illumination is 200 nm to 600 nm.

7. The method according to claim 1, wherein the fluid to be tested is an aqueous solution, an organic solvent, or an oil.

8. A method for displaying a temperature field distribution of a fluid surface, the method comprising:
   dissolving an imaging reagent having a structural formula of BS1-SP, BS2-SP, N-SP, or G-SP in a fluid to be tested, the fluid being an organic solvent;
   illuminating the organic solvent including the imaging reagent dissolved therein with a wavelength range of 200 nm to 600 nm to show patterns of different shapes on a surface of the organic solvent; and
   collecting a generated pattern and displaying the generated pattern showing the temperature field distribution of the fluid surface; wherein
   the structural formula of the imaging reagent is as follows:

BS1-SP

BS2-SP

N-SP

G-SP

9. The method according to claim 8, wherein the organic solvent is dichloromethane, 1-bromopropane, chloroform, 1,2-dichloroethane, tetrahydrofuran, 2-bromopropane, ethyl acetate, ethanol, ethyl ether, n-pentane, methanol, acetone, acetonitrile, dimethyl sulfoxide or N, N-dimethylformamide.

* * * * *